United States Patent
Ohara et al.

(10) Patent No.: US 9,458,038 B2
(45) Date of Patent: Oct. 4, 2016

(54) WASTEWATER TREATMENT PROCESS

(71) Applicant: SUMITOMO METAL MINING CO., LTD., Tokyo (JP)

(72) Inventors: Hideki Ohara, Ehime (JP); Yoshitomo Ozaki, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/895,170

(22) PCT Filed: May 15, 2014

(86) PCT No.: PCT/JP2014/062988
§ 371 (c)(1),
(2) Date: Dec. 1, 2015

(87) PCT Pub. No.: WO2014/199771
PCT Pub. Date: Dec. 18, 2014

(65) Prior Publication Data
US 2016/0115050 A1 Apr. 28, 2016

(30) Foreign Application Priority Data

Jun. 14, 2013 (JP) .................................. 2013-125700

(51) Int. Cl.
*C02F 1/52* (2006.01)
*C02F 9/00* (2006.01)
(Continued)

(52) U.S. Cl.
CPC ............. *C02F 1/5236* (2013.01); *C01B 17/48* (2013.01); *C01F 5/12* (2013.01); *C01F 5/40* (2013.01);
(Continued)

(58) Field of Classification Search
CPC .................................................. C02F 1/5236
See application file for complete search history.

(56) References Cited

U.S. PATENT DOCUMENTS

| 4,225,573 A | 9/1980 | Kobayashi |
| 4,298,379 A | 11/1981 | Zambrano |

(Continued)

FOREIGN PATENT DOCUMENTS

| JP | S57-500021 A | 1/1982 |
| JP | H09-512780 A | 12/1997 |

(Continued)

OTHER PUBLICATIONS

Jul. 15, 2014 Search Report issued in International Patent Application No. PCT/JP2014/062988.
Oct. 1, 2014 Office Action issued in Japanese Patent Application No. 2013-125700.

*Primary Examiner* — Peter Keyworth
(74) *Attorney, Agent, or Firm* — Oliff PLC

(57) ABSTRACT

A wastewater treatment process capable of selectively and efficiently separating and removing a manganese precipitate with high purity from sulfuric acid-acidic wastewater containing aluminum, magnesium, and manganese. In the wastewater treatment for a sulfuric acid-acidic wastewater containing aluminum, magnesium, and manganese, a magnesium oxide is used for part or all of the neutralizing agent to be added, the magnesium oxide is produced through the following steps (1) to (4): (1) effluent wastewater obtained by separating aluminum and manganese from sulfuric acid-acidic wastewater is concentrated, and calcium contained in the effluent wastewater is precipitated as a calcium sulfate; (2) the solution obtained in (1) is further concentrated, and magnesium is precipitated and separated as a magnesium sulfate; (3) the magnesium sulfate separated in (2) is roasted together with a reducing agent to obtain a magnesium oxide and sulfurous acid gas; and (4) the magnesium oxide obtained in (3) is washed.

9 Claims, 6 Drawing Sheets

(51) Int. Cl.
*C01G 45/02* (2006.01)
*C01F 5/12* (2006.01)
*C01F 5/40* (2006.01)
*C01F 11/46* (2006.01)
*C01G 53/00* (2006.01)
*C01B 17/48* (2006.01)
*C02F 1/66* (2006.01)
*C02F 1/04* (2006.01)
*C02F 1/72* (2006.01)
*C02F 101/20* (2006.01)
*C02F 101/10* (2006.01)
*C02F 103/10* (2006.01)

(52) U.S. Cl.
CPC ............... *C01F 11/46* (2013.01); *C01G 45/02* (2013.01); *C01G 53/006* (2013.01); *C02F 1/66* (2013.01); *C02F 9/00* (2013.01); *C01P 2002/72* (2013.01); *C01P 2004/01* (2013.01); *C01P 2006/80* (2013.01); *C01P 2006/90* (2013.01); *C02F 1/04* (2013.01); *C02F 1/72* (2013.01); *C02F 2101/10* (2013.01); *C02F 2101/20* (2013.01); *C02F 2101/206* (2013.01); *C02F 2103/10* (2013.01); *Y02W 10/37* (2015.05)

(56) References Cited

U.S. PATENT DOCUMENTS

| | | | |
|---|---|---|---|
| 5,505,857 A | | 4/1996 | Misra et al. |
| 2003/0080066 A1* | | 5/2003 | Vohra ........................ C01D 3/06 210/714 |
| 2007/0256982 A1* | | 11/2007 | Kelley ................... C02F 1/5245 210/724 |
| 2011/0091366 A1* | | 4/2011 | Kendall ................. B01D 53/62 423/220 |
| 2011/0163042 A1 | | 7/2011 | Kobayashi et al. |
| 2013/0001173 A1 | | 1/2013 | Kobayashi et al. |

FOREIGN PATENT DOCUMENTS

| | | |
|---|---|---|
| JP | 2000-093739 A | 4/2000 |
| JP | 2005-523996 A | 8/2005 |
| JP | 2005-350766 A | 12/2005 |
| JP | 2009-520661 A | 5/2009 |
| JP | 2010-207674 A | 9/2010 |
| JP | 2011-206757 A | 10/2011 |
| JP | 2013-147412 A | 8/2013 |

* cited by examiner

WASTEWATER TREATMENT PROCESS

BACKGROUND OF THE INVENTION

1. Field of the Invention

The present invention relates to a wastewater treatment process for wastewater containing aluminum and manganese, for more details, relates to a wastewater treatment process in which a magnesium oxide having a low content of impurities with high purity is produced from sulfuric acid-acidic wastewater containing magnesium and calcium, and the magnesium oxide is used as a neutralizing agent for a wastewater treatment. The present application claims a priority based on Japanese Patent Application No. 2013-125700 filed on Jun. 14, 2013 in Japan, and the Application is incorporated into the present application by reference.

2. Background Art

In a nickel oxide ore, various components such as cobalt, manganese, magnesium, and aluminum are contained in addition to nickel. In the smelting for the recovery of nickel from a nickel oxide ore, a process called dry smelting in which an oxide ore is put into a furnace together with a reducing agent and roasted has been used in many cases.

In the dry smelting, manganese, aluminum, magnesium, and the like that are not intended to be recovered are effectively separated as slag from nickel and cobalt.

In recent years, a hydrometallurgical process called a HPAL process has also been used, in which a low-grade nickel oxide ore containing only around 1 to 2% by mass or less of nickel, for which smelting cannot economically be performed in the dry smelting described above, is put into a pressurized vessel together with sulfuric acid, and a valuable metal such as nickel is leached into a sulfuric acid solution under an atmosphere of high temperature and high pressure at around 250° C.

For example, as described in Patent Literature 1, the nickel leached in a HPAL process is separated by solid-liquid separation from a slurry composed of leached residues while adding a neutralizing agent, and then into which a neutralizing agent is added to separate the nickel from impurities. Further, the nickel is recovered as a sulfide that is an intermediate material by the addition of a sulfurizing agent into the leached nickel, and separated from the impurity components that are not intended to be recovered, such as aluminum, manganese, and magnesium, which remain in a solution after sulfurization.

By the way, in the solution after sulfurization from which nickel has been separated and recovered, since manganese is present, the solution cannot be discharged as it is to the outside of the system, such as a river, and a sea area. Therefore, the solution after sulfurization is sent to a wastewater treatment step, and into which a neutralizing agent is added to adjust the pH to separate aluminum and manganese as a precipitate, then the waste liquid is intended to be discharged.

However, as compared with the dry smelting process described above, the impurity components are not easily stably fixed in a precipitate, and there may be a case of requiring considerable labor and cost. For example, in order to stably fix the manganese as a hydroxide precipitate, pH of the waste water is required to be adjusted in the range of 8 to 10. Therefore, it is required that as a neutralizing agent, an alkaline slurry of calcium hydroxide or the like is added in a large amount for the neutralization.

Further, magnesium is also contained in the solution after sulfurization described above, however, magnesium does not affect the environment, and is not required to be removed from the wastewater. However, when manganese is treated as described above, magnesium forms a precipitate at the same time of the manganese, therefore, a neutralizing agent in an excess amount to be used for forming the precipitate of the magnesium is required. In such an increase of the amount of the neutralizing agent to be used, the cost is increased, further the amount of the precipitate generated is also increased, and as a result, the labor and cost for the process are increased, and the like, therefore, this is not preferred.

With respect to the problems described above, in Patent Literature 2, a wastewater treatment process in which manganese is selectively removed from the sulfuric acid-acidic wastewater containing aluminum, magnesium, and manganese, which is obtained in Patent Literature 1, has been proposed. This process is a process in which, through a step of adjusting the pH to 4.0 or more to 6.0 or less by the addition of a first neutralizing agent into sulfuric acid-acidic wastewater to separate a solution after dealumination and an aluminum precipitate; a step of adding a slurrying solution into an aluminum precipitate to form a slurry, and then forming an aluminum precipitate slurry after the adjustment of the pH to 9.0 or more to 9.5 or less by the addition of alkali; a step of adding a second neutralizing agent into the solution after dealumination to adjust the pH to 8.0 or more to 9.0 or less, and then adding an oxidizing agent to perform oxidation neutralization and forming a slurry after the oxidation neutralization; and a step of solid-liquid separating the aluminum precipitate slurry and the slurry after the oxidation neutralization; demanganization wastewater is obtained by the suppression of precipitation of magnesium from sulfuric acid-acidic wastewater containing aluminum, magnesium, and manganese, and then a third neutralizing agent is added into the demanganization wastewater to obtain a wastewater precipitate and effluent wastewater.

By using a process described in Patent Literature 2, the amount of a neutralizing agent is reduced, therefore, the cost can be reduced. Further, the generated precipitate is reduced, therefore, the equipment scale can be reduced, and the process is preferred in the environment. In addition, the precipitation of magnesium is suppressed, therefore, the manganese grade in the precipitate is increased, and there are advantages that the cost of reuse by the recycling of manganese can be reduced.

However, in a case of the actual operation in which nickel is industrially recovered from a nickel oxide ore, there were problems that a large amount of neutralizing agent is required, and further when a calcium-based neutralizing agent such as slaked lime, and lime stone that are easily industrially available and commonly used is used, the calcium sulfate (gypsum) itself, which is purified by neutralization, becomes a precipitate, and the effective use of leached residues is limited by the coexistence of the calcium and sulfur that are components of gypsum.

Specifically, in the process of Patent Literature 2 described above, precipitation of calcium is mixed together with the precipitation of manganese, and the manganese becomes difficult to be reused as a resource, and not only cannot effectively be utilized as a valuable resource, but the manganese precipitate is accumulated to store or discarded, accordingly, the measure for the environmental protection is required.

In this point, salts having high solubility is considered to be used as a neutralizing agent, and in this application, magnesium salts such as the magnesium oxide described above, and magnesium hydroxide are suitable. Therefore, in a hydrometallurgical process for a nickel oxide ore, an attempt to recover magnesium from the wastewater generated in a process and to utilize the magnesium oxide as a neutralizing agent has also been made.

Specifically, for example, as one of the process for recovering magnesium from the solution to be sent to a wastewater treatment, there is a process described in Patent Literature 3. In Patent Literature 3, a process for recovering a magnesium oxide from a source of a magnesium sulfate, including: a step of preparing a source of a magnesium sulfate in a solution state, which is obtained from the part of the process relating to the leaching of an ore containing metal or a concentrate; a step of converting the magnesium sulfate in a solution state into a magnesium sulfate in a solid state; a step of bringing the magnesium sulfate in a solid state into contact with elemental sulfur in a reducing atmosphere; and a step of recovering the magnesium as a magnesium oxide, and the sulfur as sulfur dioxide gas; has been proposed.

However, in this process of Patent Literature 3, in order to recover the crystal of magnesium sulfate from the wastewater after the separation of valuables such as nickel, a process in which the decrease of the solubility under high concentration of sulfuric acid is utilized to perform crystallization and dehydration by the contact with the concentrated sulfuric acid produced from the sulfur dioxide gas is used. In this case, magnesium remaining without being crystallized is repeatedly used in the leaching step together with sulfuric acid, the amount of the crystallized magnesium depends on the amount of the sulfuric acid to be used for the leaching, therefore, it is not easy to maintain the balance. In particular, in a case where the magnesium is separated to be used for a neutralizing agent, or in a case where the amount of the magnesium contained in an ore is large, there is a problem that the flexibility of the operation is limited.

Further, in Patent Literature 4, a leaching process in the air in the recovery of nickel and cobalt from a laterite ore, including: a step of separating a laterite ore into an ore fraction containing low magnesium and an ore fraction containing high magnesium by selection mining or subsequent separation; a step of slurrying the separated ore fractions separately; a step of leaching an ore fraction containing low magnesium by using concentrated sulfuric acid as the primary leaching step; and a step of introducing an ore slurry containing high magnesium after the primary leaching step and the completion of the iron precipitate as another low-sulfur containing form of a goethite, an iron oxide, or an iron hydroxide, and leaching an ore fraction containing high magnesium by using the sulfuric acid liberated in an iron precipitate as the secondary leaching step; has been proposed.

By using such a process, it is also considered that the magnesium contained in a nickel oxide ore is used as a neutralizing agent, or magnesium is recovered from a solution after neutralization and can repeatedly be used as a neutralizing agent.

However, in a case of using these process, an enormous amount of heat energy is required when magnesium is concentrated from a large amount of wastewater, and further there is a concern that impurities contained in a mineral are accumulated in a process with the repeated use of the neutralizing agent.

In addition, it is common that the grade of the magnesium contained varies depending on the kind of the mineral, the mining place, or the time of mining, and is not stable. Therefore, if the magnesium is insufficient, it is considered to use a calcium-based neutralizing agent that is inexpensive and can stably be supplied, such as conventional slaked lime and lime stone, in combination. However, in this case, as in the conventional process described above, calcium is also introduced into a process, and circulated in the process. Further, when magnesium is tried to be recovered from wastewater, part of calcium behaves as in magnesium, therefore, magnesium cannot be used for an application other than that of the neutralizing agent.

As a process for separating magnesium and calcium in a solution, for example, there is a process shown in Patent Literature 5. In the process described in Patent Literature 5, magnesium hydroxide is recovered from the waste liquid containing a large amount of magnesium sulfate, which is discarded and discharged in a flue gas desulfurization plant in which a magnesium hydroxide is used as a desulfurizing agent, and circulated into a flue gas desulfurization step, therefore, the process contributes to the recycling and the environmental cleanup. Specifically, ammonia is added into the flue gas desulfurization wastewater containing a magnesium sulfate to form a precipitate of a magnesium hydroxide, and into the resultant solution, milk of lime is added to form a calcium sulfate and ammonia, and the ammonia is circulated in the step. The magnesium hydroxide obtained as described above is slurried by the final waste liquid of the present process, and by the circulation of the slurry into a desulfurization plant, complete circulation of wastewater in the desulfurization plant is realized, as a result, the elimination of the discarding and discharging of wastewater can be realized. In addition, a washing step is provided to improve the purity of the obtained calcium sulfate, and as a result, the advantage of outside sales can be enhanced.

However, in the process described in Patent Literature 5, since ammonia is used, a complicated equipment is required, further there is a problem that the investment and operation cost are increased, and the process is difficult to be easily used. Further, as described above, when the magnesium hydroxide and magnesium oxide produced from the magnesium components contained in a nickel oxide ore are tried to be used as a neutralizing agent, it is unavoidable to be expensive in the cost as compared with lime stone or slaked lime, and it is not practical to cover all the water-soluble neutralizing agent with the magnesium hydroxide and magnesium oxide produced above. In addition, there may also be an influence of the calcium component and the like contained in an ore or in the impurities that are treated at the same time.

Therefore, in Patent Literature 6, a process for adjusting magnesium oxide from a metal sulfate solution containing magnesium sulfate and calcium is shown. This process is a process in which metals other than the magnesium are precipitated as a hydroxide to perform solid-liquid separation, the separated solution is concentrated so that the specific gravity is in the range of 1.35 to 1.5 and a calcium sulfate is separated, a magnesium sulfate is recovered from the solution after the separation, and a magnesium oxide is recovered by thermal decomposition.

However, in the process described in Patent Literature 6, there is a problem that when the concentration is advanced in order to separate the calcium sulfate, part of the magnesium is also precipitated together with calcium, and the recovery efficiency is lowered. This is because when a compound of a calcium sulfate dihydrate is precipitated, a magnesium sulfate heptahydrate is started to be precipitated in parallel, and in order to separate both, various process such as a process for analyzing a component of a solution, a process for observing the apparent difference with the naked eye, or a process for measuring the specific gravity can be used, however, it takes a lot of labor.

As described above, in the conventional process, it is not easy to obtain a magnesium oxide having a low content of impurities with high purity efficiently and at a low cost, and in a case where the magnesium oxide is used for a wastewater treatment as a neutralizing agent, the grade of the manganese separated from wastewater is impaired, and further as a result, the cost required for the separation of the manganese is also increased.

PRIOR ART

Patent Document

Patent Literature 1: Japanese Patent Application Laid-Open (JP-A) No. 2005-350766
Patent Literature 2: JP-A No. 2011-206757
Patent Literature 3: Japanese Patent Application National Publication No. 2009-520661
Patent Literature 4: Japanese Patent Application National Publication No. 2005-523996
Patent Literature 5: JP-A No. 2000-93739
Patent Literature 6: Japanese Patent Application National Publication No. S57-500021

BRIEF SUMMARY OF THE INVENTION

Accordingly, the present invention has been proposed in view of the circumstances described above, and an object of the present invention is to provide a wastewater treatment process capable of selectively and efficiently separating and removing a manganese precipitate with high purity from the sulfuric acid-acidic wastewater containing aluminum, magnesium, and manganese.

As a result of intensive studies to solve the problems described above, the present inventors have found that the magnesium oxide produced through the following steps (1) to (4) is a form of a low content of impurities and high purity, and by using the magnesium oxide as a neutralizing agent for a process of the sulfuric acid-acidic wastewater containing aluminum, magnesium, and manganese, a manganese precipitate with high purity can selectively and efficiently be separated and removed, and thus have completed the present invention.

That is, the first invention of the present invention is a wastewater treatment process in which a first neutralizing agent is added into sulfuric acid-acidic wastewater containing aluminum, magnesium, and manganese to separate an aluminum hydroxide precipitate, then a second neutralizing agent and a oxidizing agent are added to separate a manganese precipitate, and then a third neutralizing agent is added to obtain a wastewater precipitate and effluent wastewater, is characterized by using for part or all of first to third neutralizing agents to be added a magnesium oxide produced through the following steps (1) to (4):
(1) a calcium separation step of concentrating effluent wastewater obtained by separating aluminum and manganese from sulfuric acid-acidic wastewater, and precipitating and separating calcium contained in the effluent wastewater as a calcium sulfate;
(2) a magnesium crystallization step of further concentrating a solution obtained through the calcium separation step, and precipitating and separating magnesium contained in the solution as a magnesium sulfate;
(3) a roasting step of roasting the magnesium sulfate separated in the magnesium crystallization step together with a reducing agent, and obtaining a magnesium oxide and sulfurous acid gas; and
(4) a washing step of washing the magnesium oxide obtained in the roasting step.

Further, the second invention of the present invention is characterized in that an endpoint of concentration in the calcium separation step (1) described above is set as a time point when specific gravity of a solution after concentration becomes 1.25 g/cm$^3$, in the first invention.

In addition, the third invention of the present invention is characterized in that concentration of solutions in the calcium separation step (1) described above and the magnesium crystallization step (2) described above is performed by air drying, in the first or second invention.

Further, the forth invention of the present invention is characterized in that a first neutralizing agent is added into the sulfuric acid-acidic wastewater to adjust pH to 7.0 to 8.5, and then filtrate obtained from solid-liquid separation is used for the calcium separation step (1) described above, in any one of the first to third inventions.

In addition, the fifth invention of the present invention is characterized in that in the roasting step (3) described above, any one or more kinds of coke, coal, charcoal, bamboo charcoal, and spent carbon are used as a reducing agent, in any one of the first to forth inventions.

Further, the sixth invention of the present invention is characterized in that the sulfuric acid-acidic wastewater described above is a solution after a nickel oxide ore is leached together with sulfuric acid under high temperature and high pressure to obtain a leachate containing nickel, a neutralizing agent containing calcium and/or magnesium is added into the obtained leachate to remove impurities, and then a sulfurizing agent is added into the resultant leachate to precipitate and separate the nickel, in any one of the first to fifth inventions.

In addition, the seventh invention of the present invention is characterized in that sulfurous acid gas generated in the roasting step (3) described above is converted into sulfuric acid, and the obtained sulfuric acid is repeatedly used as sulfuric acid to be used for leaching of a nickel oxide ore under high temperature and high pressure, in the sixth invention.

Further, the eighth invention of the present invention is characterized in that water is added into a crystal of magnesium sulfate obtained in the magnesium crystallization step (2) described above to dissolve the crystal, and the obtained solution is repeatedly concentrated in the magnesium crystallization step again, in any one of the first to seventh inventions.

Advantageous Effects of Invention

In the present invention, a magnesium oxide having a low content of impurities with high purity is produced, and the magnesium oxide is used as a neutralizing agent for a process of the sulfuric acid-acidic wastewater containing aluminum, magnesium, and manganese, therefore, a manganese precipitate with high purity can selectively be separated and removed.

In addition, the magnesium oxide to be used as a neutralizing agent can easily efficiently be produced in a form of having a low content of impurities with high purity from a sulfuric acid solution containing magnesium and calcium, such as wastewater, therefore, can be used as a neutralizing agent to perform an efficient wastewater treatment. Further, when the present invention is applied to a leachate obtained by a hydrometallurgical process using a HPAL process for a nickel oxide ore, which is subjected to a wastewater treatment, the amount of the residue generated in the HPAL process can be reduced, and further the neutralizing agent, sulfuric acid, and the like, which are used in the process, can repeatedly be used, as a result, the amount to be newly used can be reduced, and the efficient process can be performed.

DETAILED DESCRIPTION OF THE INVENTION

Figure 1:
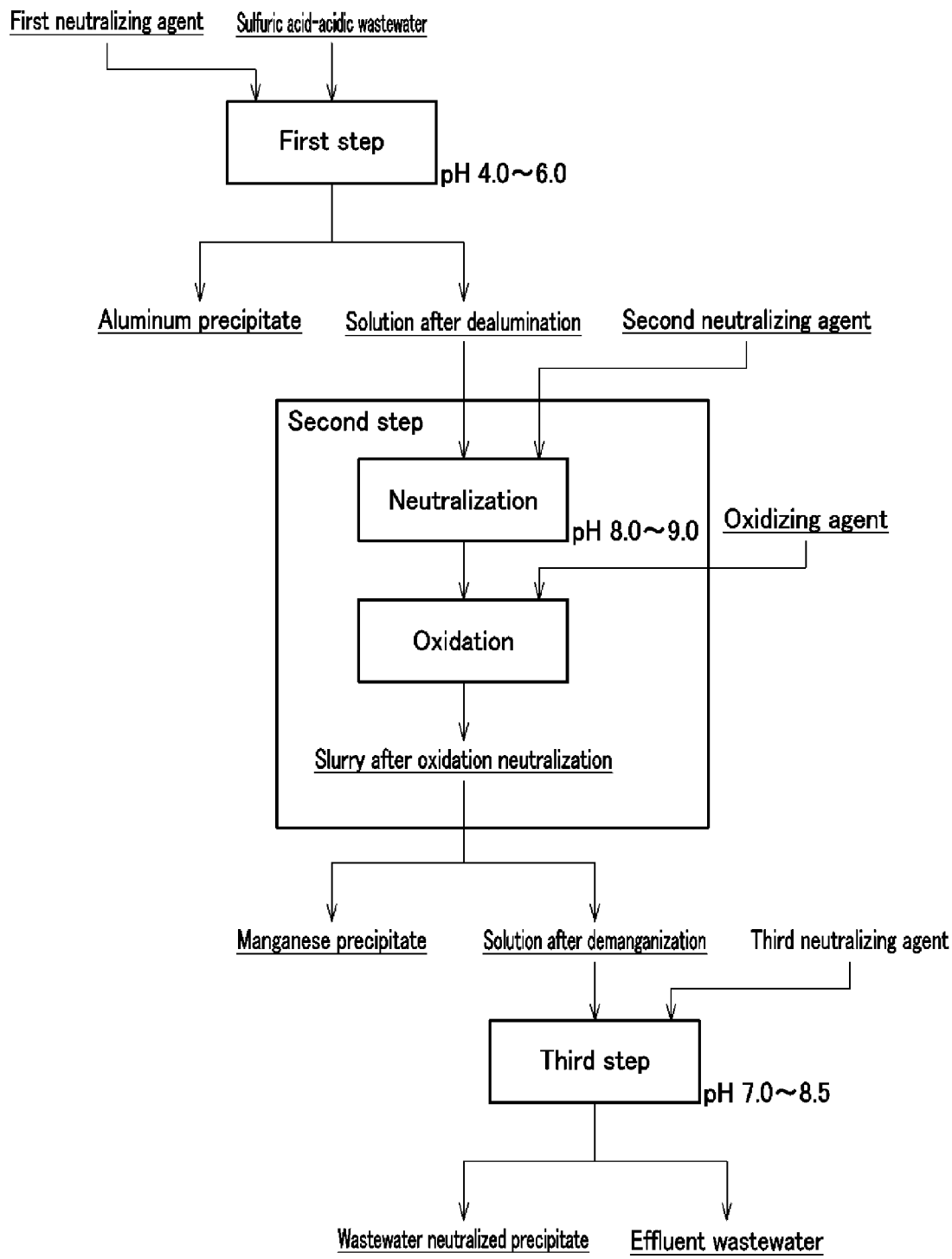
FIG. 1 is a process chart showing a flow of a wastewater treatment process.

Hereinafter, a specific embodiment of the wastewater treatment process according to the present invention (hereinafter, referred to as "the present embodiment") will be described in detail in the following order with reference to the drawings. Further, the present invention is not limited to the following embodiment, and appropriate changes may be made as long as the spirit of the present invention is not changed.

1. Overview of wastewater treatment process
2. Each step of wastewater treatment process
3. Production process of magnesium oxide
    (1) Calcium separation step
    (2) Magnesium crystallization step
    (3) Roasting step
    (4) Washing step
4. Production of magnesium oxide based on hydrometallurgical process for nickel oxide ore
    4-1. HPAL process of nickel oxide ore
    4-2. Wastewater treatment step
    4-3. Production process of magnesium oxide
    4-4. Sulfuric acid production step
5. Examples

1. Overview of Wastewater Treatment Process

The wastewater treatment process according to the present embodiment is a process in which a first neutralizing agent is added into sulfuric acid-acidic wastewater containing aluminum, magnesium, and manganese to separate an aluminum hydroxide precipitate, then a second neutralizing agent and a oxidizing agent are added to separate a manganese precipitate, and then a third neutralizing agent is added to obtain a wastewater precipitate and effluent wastewater.

As the sulfuric acid-acidic wastewater that is subjected to the wastewater treatment process, for example, in a hydrometallurgical process of a HPAL process for a nickel oxide ore, a solution after a nickel oxide ore is leached together with sulfuric acid under high temperature and high pressure to obtain a leachate containing nickel, a neutralizing agent containing calcium and/or magnesium is added into the obtained leachate to remove impurities, and then a sulfurizing agent is added into the resultant leachate to precipitate and separate the nickel can be used.

In the sulfuric acid-acidic wastewater discharged in such nickel oxide ore smelting, for example, manganese, magnesium, and aluminum are contained at the level of a manganese concentration of 2 to 6 g/L, a magnesium concentration of 3 to 12 g/L, and an aluminum concentration of 2 to 6 g/L, respectively.

Further, the wastewater treatment process according to the present embodiment is characterized by using a magnesium oxide produced through the following steps (1) to (4) for part or all of the first to third neutralizing agents to be used for a process of the sulfuric acid-acidic wastewater described above.

That is, a magnesium oxide is used, which is obtained through (1) a calcium separation step S1 of concentrating the effluent wastewater obtained by the separation of aluminum and manganese from sulfuric acid-acidic wastewater, and precipitating and separating the calcium contained in the effluent wastewater as a calcium sulfate; (2) a magnesium crystallization step S2 of further concentrating a solution obtained through the calcium separation step S1, and precipitating and separating the magnesium contained in the solution as a magnesium sulfate; (3) a roasting step S3 of roasting the obtained magnesium sulfate together with a reducing agent, and obtaining a magnesium oxide and sulfurous acid gas; and (4) a washing step S4 of washing the magnesium oxide obtained in the roasting step S3.

In the production process of a magnesium oxide, as described above, the effluent wastewater containing magnesium and calcium is concentrated and separated in two stages. That is, at first, calcium is precipitated as a crystal of a salt in a form of a calcium sulfate dihydrate and separated, and next, magnesium is precipitated as a crystal of a salt in a form of a magnesium sulfate heptahydrate and separated. Further, the obtained crystal of a magnesium sulfate heptahydrate is roasted together with a reducing agent such as coke, and charcoal to obtain a magnesium oxide, and further the obtained magnesium oxide is washed to obtain a magnesium oxide with high purity.

In addition, in the wastewater treatment process according to the present embodiment, the magnesium oxide having a low content of impurities with high purity obtained in this way is used as a neutralizing agent for a wastewater treatment. Accordingly, a manganese precipitate having an extremely low content of calcium as impurities with high purity is selectively separated and removed from the sulfuric acid-acidic wastewater containing aluminum, magnesium, and manganese.

Further, in the production process of the magnesium oxide described above, a magnesium oxide having a low content of impurities with high purity can easily efficiently be produced from a solution containing magnesium and calcium, such as wastewater, therefore, an efficient wastewater treatment can be performed by using the magnesium oxide as a neutralizing agent.

In addition, a magnesium oxide is produced for the leachate obtained by a hydrometallurgical process using a HPAL process and using a nickel oxide ore as a raw material, and the magnesium oxide is used as a neutralizing agent for a wastewater treatment, as a result, the amount of the residues generated in the HPAL process can be reduced, and further the neutralizing agent, sulfuric acid, and the like that are used in the process can repeatedly be used. Accordingly, the amounts of these agents to be newly used can be reduced, and efficient operation can be performed.

2. Each Step of Wastewater Treatment Process

First, each step of the wastewater treatment process according to the present embodiment will be described.

A process chart of the wastewater treatment process is shown in FIG. 1. As shown in FIG. 1, the wastewater treatment process according to the present embodiment includes: a first step of adding a first neutralizing agent into the sulfuric acid-acidic wastewater containing aluminum, magnesium, and manganese, and separating an aluminum hydroxide precipitate; a second step of adding a second neutralizing agent and an oxidizing agent, and separating a manganese precipitate; and a third step of adding a third neutralizing agent, and obtaining a wastewater precipitate and effluent wastewater.

<2-1. First Step>

First, in the first step, a first neutralizing agent is added into the sulfuric acid-acidic wastewater containing aluminum, magnesium, and manganese to adjust the pH, and the aluminum is separated from the wastewater.

In the first step, by the neutralization process of adding a first neutralizing agent, the pH of the wastewater is adjusted to 4.0 to 6.0, and preferably in the range of 4.0 to 5.0, and the aluminum contained in the wastewater is separated as an aluminum hydroxide precipitate. When the pH is less than 4.0, the aluminum is insufficiently precipitated, the amount of the aluminum remaining in the solution is increased, and the aluminum that is coprecipitated with magnesium in the oxidation in the second step may be increased. On the other hand, when the pH exceeds 6.0, the pH is locally increased at the time of pH adjustment, coprecipitation of magnesium is generated, and the amount of precipitate may be increased.

When the neutralization process is performed as described above, the slurry is subjected to solid-liquid separation to be separated into a precipitated aluminum precipitate (aluminum hydroxide precipitate), and a solution after dealumination of the liquid content. The process of a solid-liquid separation process is not particularly limited, and examples of the process include a process for separating as a concentrated slurry by using a thickener, and a process for recovering as a precipitate by using a filter press and the like.

<2-2. Second Step>

Next, in the second step, a second neutralizing agent and an oxidizing agent are added into a solution after dealumination of the liquid content after the separation of an aluminum hydroxide precipitate, and a manganese precipitate is separated.

In the second step, a neutralization process in which a second neutralizing agent is added is performed to adjust the pH of the solution after dealumination in the range of 8.0 to 9.0. When the pH is extremely high, the amount of a neutralizing agent to be used is increased, and further the tendency of remelting the aluminum remaining as a suspended solid matter, or the like becomes strong.

Subsequently, in the second step, an oxidizing agent is added into a solution to oxidize the manganese ions contained in the solution from divalent to trivalent (oxidation), and a slurry after oxidation neutralization containing an oxide of manganese (manganese precipitate) is obtained. The addition of the oxidizing agent is preferably performed after the neutralizing agent (alkali component) described above is firstly added and the pH of the wastewater reaches the equilibrium state.

The oxidizing agent is not particularly limited, however, as the oxidizing agent, air, oxygen, ozone, peroxide, sulfur dioxide, or the like can be used. In consideration of the efficiency, and the ease of handling, a process in which oxygen gas is supplied from a cylinder or the like, and blown into a solution by using sinter glass, a pipe, or the like is preferred.

In addition, the additive amount (supply amount) of the oxidizing agent may be an amount required for the oxidation of the manganese ions in a solution from divalent to trivalent. Specifically, while measuring the oxidation-reduction potential of wastewater by using a silver-silver chloride electrode as a reference electrode, the potential may be managed using being as a guide, in the potential range of 50 to 300 mV that is generally a range in which manganese ions are converted from divalent to trivalent, for example, by the adjustment of the blowing amount of the oxygen gas, by chemically analyzing the valency number of the manganese ion by sampling the wastewater, or the like.

When the oxidation neutralization process is performed as described above, the slurry after oxidation neutralization is subjected to solid-liquid separation to be separated into a precipitated manganese precipitate, and a solution after demanganization of the liquid content. The process of a solid-liquid separation process is not particularly limited, and examples of the process include a process for separating as a concentrated slurry by using a thickener, and a process for recovering as a precipitate by using a filter press and the like.

<2-3. Third Step>

Next, in the third step, a third neutralizing agent is added into a solution after demanganization of the liquid content after the separation of a manganese precipitate, and a wastewater neutralized precipitate and effluent wastewater are separated.

In the third step, a neutralization process in which a third neutralizing agent is added is performed to adjust the pH of the solution after demanganization in the range of 7.0 to 8.5.

In the wastewater treatment process according to the present embodiment, it is characterized in that in part or all of the first to third neutralizing agents to be used in the first to third steps described above, a magnesium oxide obtained by the production process of a magnesium oxide described in detail below is used.

3. Production Process of Magnesium Oxide

Figure 2:
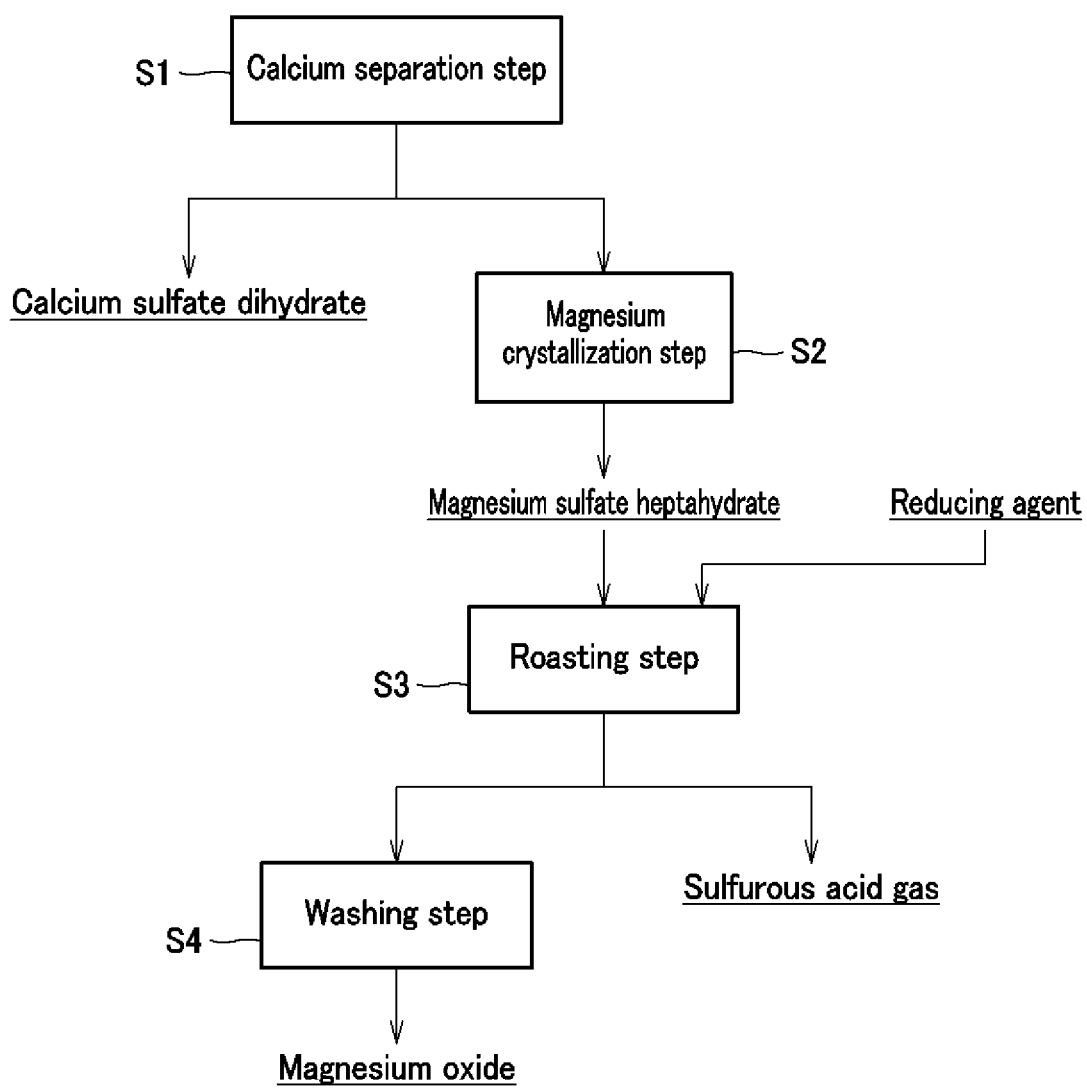
FIG. 2 is a process chart showing a flow of a production process of a magnesium oxide.

Herein, as to the magnesium oxide to be used for part or all of the first to third neutralizing agents in the wastewater treatment process described above, the production process will be described in detail in each step. FIG. 2 is a process chart of a production process of the magnesium oxide.

(1) Calcium Separation Step

In the calcium separation step S1, effluent wastewater in which aluminum and manganese are separated from the sulfuric acid-acidic wastewater containing aluminum, magnesium, and manganese, that is, a sulfuric acid solution containing magnesium and calcium is concentrated, and the calcium contained in the solution is precipitated and separated as a calcium sulfate. This calcium separation step S1 is a step of performing concentration and separation in the first stage.

The sulfuric acid solution that is subjected to concentration is a sulfuric acid solution containing magnesium and calcium, and as described above, is effluent wastewater in which aluminum and manganese are separated from the sulfuric acid-acidic wastewater containing aluminum, magnesium, and manganese. Specifically, wastewater that has been conventionally discarded in a process for metal smelting and the like, or the like can be used. As the sulfuric acid solution composed of the wastewater or the like, for example, a filtrate obtained by the adjustment of the pH to 7.0 to 8.5 by the addition of a neutralizing agent, and by solid-liquid separation is preferably used. As described above, by using the sulfuric acid solution obtained by a wastewater treatment for a solution composed of wastewater and the like, the purity of crystals can further be enhanced, and a magnesium oxide with higher quality can be produced.

The concentration and separation process in the calcium separation step S1 utilizes the fact that the solubility of a calcium sulfate dihydrate is lower than that of a magnesium sulfate heptahydrate, and the calcium sulfate dihydrate is precipitated in preference to the magnesium sulfate heptahydrate in the concentration process. Accordingly, calcium contained in a sulfuric acid solution is selectively separated.

The size of the calcium sulfate crystal to be precipitated is not particularly limited, and further is not sweepingly determined, however, by the performing of a test in advance, the size may appropriately be selected depending on the degree of the concentration productivity and the separation of the impurities coexisted.

The concentration process of a sulfuric acid solution is not particularly limited as long as being a process in which water content in the sulfuric acid solution is evaporated and a crystal of calcium is precipitated, various process can be used. For example, examples of the concentration process include a process of heating from the outside by using oil, electric power, or the like, which has commonly been performed. Further, among the various process, a concentration process by air drying (solar drying) using a natural energy such as solar heat, geothermal heat, or wind, may particularly preferably be used.

As to such a process of heating from the outside, and air drying, it is not limited to a case where either one of these is only performed, for example, preparatory concentration is performed until the degree that the crystal is not precipitated by external heating, and then air drying is performed, or concentration is performed in the reverse order, or the like, these can be performed in combination.

Specifically, as a process for performing concentration by air drying, various process such as a process in which a sulfuric acid solution such as wastewater that is subjected to concentration is put in a vessel and left outdoors to perform sun drying, or as conventionally used in a flow down salt field, a sulfuric acid solution is added dropwise on a branches-type bed assembled by bamboo or vinyl, and the grown crystals are recovered, can be used.

The concentration process suitable for calcium separation in the calcium separation step S1 is preferably performed in the range in which the precipitation of a calcium sulfate dihydrate is observed, but the precipitation of a magnesium sulfate heptahydrate is not observed. The specific range can be determined by various process such as a process for analyzing a component of a solution, a process for observing the apparent difference with the naked eye, or a process for measuring specific gravity.

In particular, according to a process in which the degree of concentration process, that is, the endpoint of the concentration process is determined by the measurement of the specific gravity, calcium can effectively be separated and removed by a simple process. Specifically, the present inventors have found that in a case where a sulfuric acid solution is gradually concentrated by air drying, by using the range of specific gravity of the solution of 1.1 to 1.3 $g/cm^3$ as a boundary, in a case where the specific gravity is lower than the range, crystallization of a calcium sulfate is generated, and when the concentration is advanced and the specific gravity is higher than the range, crystallization of a magnesium sulfate is gradually started.

For example, in a case of wastewater composed of a sulfuric acid solution at a magnesium concentration of 5 g/L, and a calcium concentration of around 0.5 g/L, which is discharged through a HPAL process, during the concentration until the specific gravity reaches the range described above, 80 to 90% or more of the calcium contained in the solution can effectively be separated and removed.

Therefore, in the calcium separation step S1, the specific gravity of a sulfuric acid solution is measured, and appropriately depending on the grade, the time point when the specific gravity becomes in the range of around 1.1 to 1.3 $g/cm^3$ is determined as an endpoint of the concentration process, as a result, by using a simple process, that is, specific gravity measurement, calcium can effectively separate at high ratio. Further, more preferably, by determining the time point when the specific gravity becomes around 1.25 $g/cm^3$ as the endpoint of the concentration process, calcium can more effectively be separated at high ratio.

Solid-liquid separation of a crystal of the crystallized calcium sulfate and a solution can be performed by using a filter filtration apparatus, a centrifugal separator, or the like. In a case where the crystal grains to be crystallized are coarse, solid-liquid separation is more promptly advanced by using these apparatuses, and the equipment requires only the compact in size, and further the moisture adhered to the crystal is also slight, accordingly this is advantageous also in the quality.

(2) Magnesium Crystallization Step

In the magnesium crystallization step S2, a solution obtained through the calcium separation step S1 of (1) is further concentrated, and magnesium in the solution is precipitated and taken out as a crystal of a magnesium sulfate heptahydrate. This magnesium crystallization step S2 is a step of performing concentration and separation in the second stage.

As the concentration process in the magnesium crystallization step S2, in the same manner as in the concentration process in the calcium separation step S1 of (1) described above, various process can be used, and a concentration process by air drying (solar drying) using a natural energy such as solar heat, geothermal heat, or wind, is particularly preferably used. Alternatively, these concentration process can be used in combination.

Herein, although the following is the same also in the calcium separation step S1 described above, however, in a case where the concentration is performed by air drying as the concentration process in the magnesium crystallization step S2, it can also be considered that it apparently takes an abundance of time as compared with the concentration process by external heating using oil, electric power, or the like, and is not efficient. However, for example, in the wastewater (sulfuric acid solution) generated in a hydrometallurgical process for a nickel oxide ore, around 10 to 20 g/L of magnesium is contained, therefore, magnesium can more efficiently be concentrated as compared with the sea water containing only around 1.3 g/L of magnesium.

In addition, in the drying using a natural energy, the water content is gradually evaporated, therefore, the condition of the solution during the evaporation can finely be managed. Further, since the crystal of the salt to be precipitated is also coarsely grown, impurities that are not subjected to the recovery, such as aluminum, can be suppressed from being mixed into the gap among the crystal grains of a magnesium sulfate, therefore, a crystal having less impurities with high purity can be obtained.

Figure 3A:
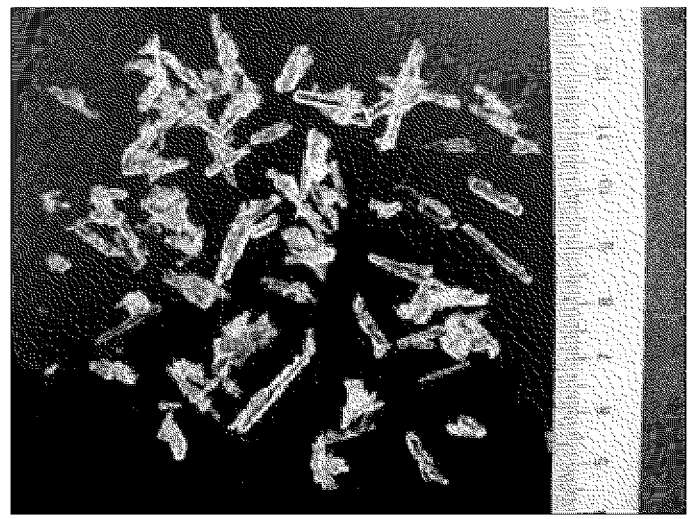
FIG. 3(A) is a picture showing a crystal condition of the magnesium sulfate formed by a concentration process using air drying (solar drying).
Figure 3B:
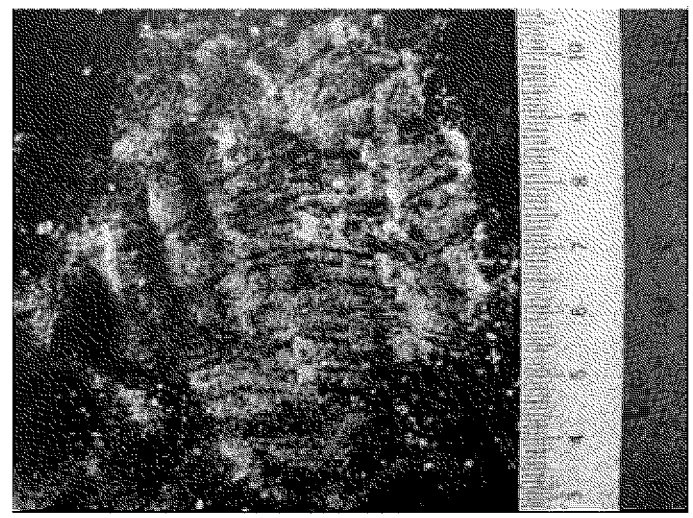
FIG. 3(B) is a picture showing a crystal condition of the magnesium sulfate formed by a concentration process using external heating.

FIG. 3(A) is a picture showing a crystal condition in a case where in the magnesium crystallization step S2, a solution is left outdoors and air dried (solar dried), and subjected to concentration process to precipitate a crystal of magnesium sulfate. On the other hand, FIG. 3(B) is a picture showing a crystal condition in a case where water content is evaporated in a water bath heated to 80° C. by external electric power, and a concentration process is performed to precipitate a crystal of magnesium sulfate. As can be seen from the pictures of FIGS. 3(A) and 3(B), it is understood that a crystal of magnesium sulfate is precipitated by a concentration process using air drying, as a result, a crystal, which is much larger as compared with a crystal in a case where water content is evaporated by external heating and the solution is crystallized, can be formed.

As described above, in the magnesium crystallization step S2, for example, with the precipitation of a crystal by the concentration of a solution at a low drying rate using air drying or the like, a magnesium sulfate composed of coarse crystal grains can efficiently be precipitated and recovered. In addition, by allowing a crystal to grow largely, a calcium component that adheres on the surface of a crystal, and a calcium component that is contained in a crystal of magnesium by the coprecipitation can be reduced. Further, a coarse crystal can be formed as described above, therefore, during the reduction roasting in following roasting step S3, the recovery loss generated by the scattering of a crystal to dust, can be prevented.

In addition, in the concentration process, when a crystal of magnesium sulfate is immersed as a seed in a solution, the seed serves as a nucleus and the precipitation of a magnesium sulfate crystal is generated, as a result, a more coarse crystal can efficiently be obtained.

Further, the endpoint of the concentration process in the magnesium crystallization step S2 can be determined arbitrarily. In addition, the solid-liquid separation of a crystal of the crystallized magnesium sulfate and a solution can also be performed by using a filter filtration apparatus, a centrifugal separator, or the like, in the same manner as in the calcium separation step S1.

In addition, in the air drying (solar drying), for example, the drying is gradually performed over around from several days to several weeks, however, since there are factors of humidity, temperature, and the like, the drying rate, that is, the drying time required for a liquid amount is difficult to be uniformly determined. Therefore, the drying rate is preferably appropriately set depending on these various factors.

Further, if the drying rate is the same as that of the air drying, the evaporation may be promoted by heating, however, the drying may extremely be inefficient as compared with the air drying. In addition, in a case where the magnesium concentration in a solution is low, in order to reduce the drying time, a process in which the solution is concentrated to a certain extent by using a water bath or the like, and then air drying is performed may be used. Further, for example, as performed in a dripping salt field in the past, a process in which a solution is sprayed onto a solid matter, and the crystal precipitation on the surface of the solid matter is promoted may be used.

In addition, water is added into the crystal of magnesium sulfate obtained by the concentration in order to dissolve the crystal again, and operation in which a crystal of magnesium sulfate is precipitated again from the resultant solution may be performed once or more. Accordingly, a magnesium sulfate crystal having much less impurities can be precipitated.

(3) Roasting Step

In the roasting step S3, the magnesium sulfate obtained in the magnesium crystallization step S2 of (2) is roasted together with a reducing agent, and a magnesium oxide and sulfurous acid gas are obtained.

In the roasting step S3, for example, as shown in the following reaction formula (i), the magnesium sulfate is reduced and decomposed, and a reaction to form a magnesium oxide, sulfurous acid gas, and water is generated.

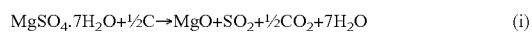

$$MgSO_4 \cdot 7H_2O + \tfrac{1}{2}C \rightarrow MgO + SO_2 + \tfrac{1}{2}CO_2 + 7H_2O \qquad (i)$$

As the reducing agent used in the roasting step S3, as shown in the reaction formula (i), for example, coke can be used, and a carbon-based reducing agent such as other coal, charcoal, bamboo charcoal, and spent carbon can be used. Further, Propane gas, LPG gas, or the like may be used as a reducing agent. Among them, charcoal, bamboo charcoal, and the like are renewable energy, and are particularly excellent in the environment.

In addition, sulfur can also be used as a reducing agent, however, if sulfur remains, effluent gas is required to be detoxified when a magnesium oxide is used, and which may affect the precipitate of manganese obtained through a wastewater treatment or the wastewater treatment itself, therefore, this is not preferred.

The equivalent of a reducing agent may be selected by the performing of a test in advance, however, for example, in a case of coke, one equivalent is slightly insufficient, and around two equivalents are desirably added.

Further, in others, the conditions in a reduction roasting process are not particularly limited, and may appropriately be selected depending on the amount of magnesium, the kind of a reducing agent, the apparatus to be used, and the like. For example, in a case where the roast is performed by using coke as a reducing agent, and using a rotary kiln, the additive amount of the reducing agent is 0.5 mol/mol or more that is two equivalents with respect to magnesium, the reaction temperature is desirably around 950 to 1100° C., and the retention time is desirably around 1 to 5 hours.

(4) Washing Step

In the washing step S4, a magnesium oxide obtained in the roasting step S3 of (3) is washed. The magnesium oxide formed by the roasting step S3 can be used as it is for the application of a neutralizing agent described below, however, by the performing of a washing process as in the above, the purity of the magnesium oxide can further be enhanced.

In a washing process in the washing step S4, water can be used. The solubility of the magnesium oxide to water is 0.0086 g/100 mL at 20° C. Therefore, by the washing with water in the washing step S4, a substance having a solubility higher than that of a magnesium oxide to water can be separated, and the purity of the magnesium oxide can be improved.

More specifically, in a case of a calcium sulfate, the solubility of a calcium sulfate anhydrate to water at 20° C. is 0.24 g/100 mL, and is extremely higher than that of a magnesium oxide at 20° C. Therefore, the calcium that cannot be separated in a concentration process with the two stages of the calcium separation step S1 of (1) and magnesium crystallization step S2 of (2) described above can also be separated by a washing process in the washing step S4, and a magnesium oxide having higher purity can be obtained.

As described above, in the production process of the magnesium oxide, a concentration process is performed in two stages in which firstly, calcium is precipitated as a crystal of calcium sulfate from a sulfuric acid solution containing magnesium and calcium, and next, magnesium is precipitated as a crystal of magnesium sulfate from the solution from which calcium has already been separated, and is removed. Further, the crystal of the magnesium sulfate heptahydrate obtained is roasted together with a reducing agent to obtain a magnesium oxide, and then the magnesium oxide is washed to obtain a magnesium oxide with high purity.

According to the process, for example, a magnesium oxide having a low content of the impurities such as calcium with high purity can efficiently be produced with a simple operation from a solution containing magnesium and calcium, such as wastewater.

Further, in a wastewater treatment process according to the present embodiment, for the part or all of the first to third neutralizing agents to be used in the above-described first to third steps, respectively, the magnesium oxide obtained as described above is used to perform a wastewater treatment. By performing as in the above, in the wastewater treatment, a manganese precipitate having less impurities with high purity can selectively and efficiently separated and removed.

In addition, the magnesium oxide having a low content of impurities with high purity, which is produced as described above, not only can be used as a neutralizing agent for a wastewater treatment, but also can suitably be used for, for example, a fire brick constituting an electric furnace and the like, a material of alloy, and the like.

4. Production of Magnesium Oxide Based on Hydrometallurgical Process for Nickel Oxide Ore By the way, as a sulfuric acid solution containing magnesium and calcium, which is used in the above-described production process of a magnesium oxide, a leachate containing the nickel obtained by a HPAL process in which a nickel oxide ore is leached together with sulfuric acid under high temperature and high pressure, can be used. More specifically, a neutralizing agent containing calcium and/or magnesium is added into the leachate containing nickel, which is obtained by the leaching of a nickel oxide ore by a high temperature high pressure leaching process (HPAL process), to separate impurities, and then a mixed sulfide of nickel and cobalt is precipitated and separated by the addition of a sulfurizing agent to obtain a solution, the solution is subjected to a wastewater treatment to obtain effluent wastewater, and the effluent wastewater can be used as the sulfuric acid solution.

Figure 4:
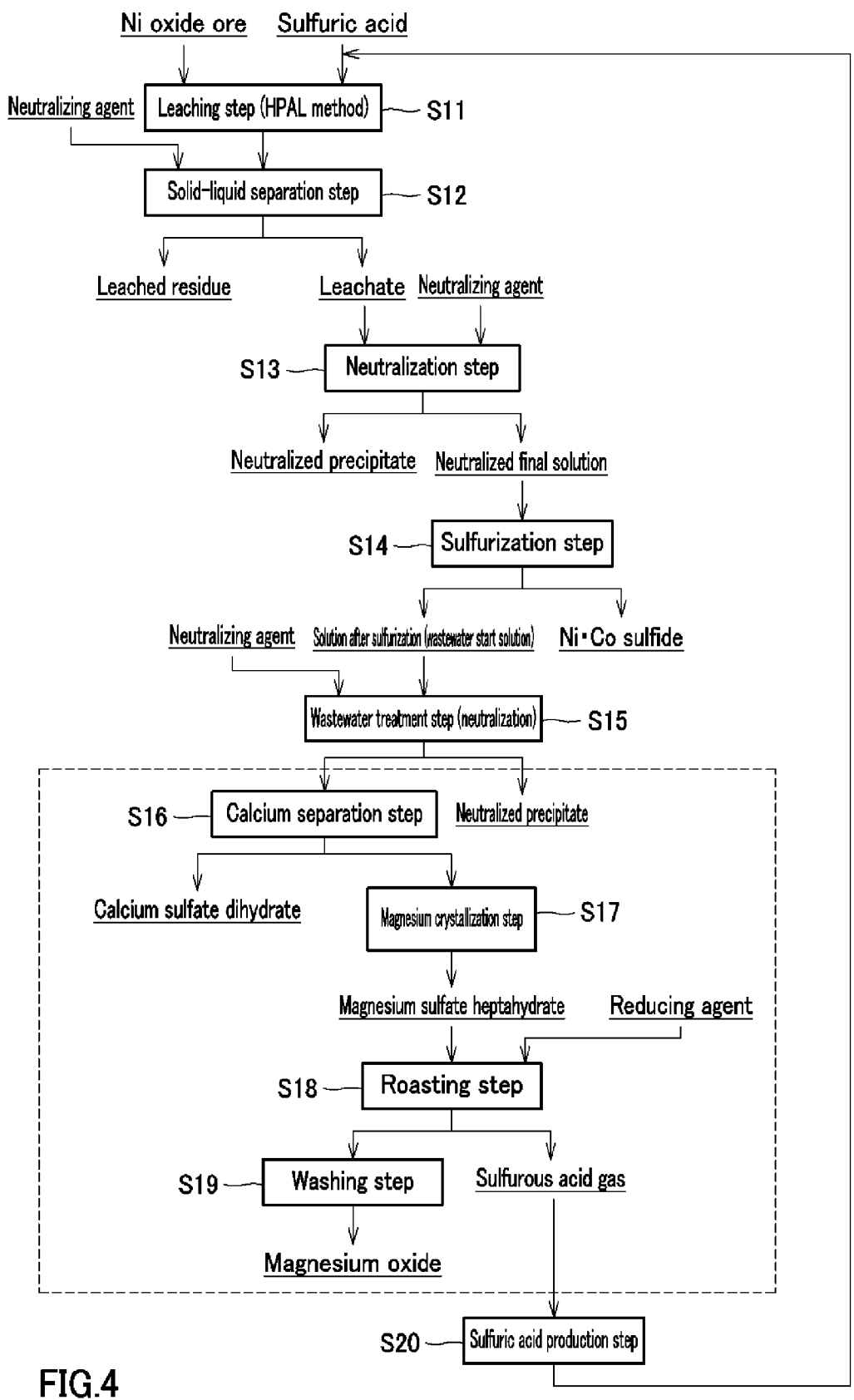
FIG. 4 is a process chart showing a flow of a production process of a magnesium oxide based on a hydrometallurgical process for a nickel oxide ore.

FIG. 4 is a process chart showing a series of process in a case where the above-described production process of a magnesium oxide is applied by using the solution obtained by the separation of a nickel-cobalt mixed sulfide by a hydrometallurgical process for a nickel oxide ore using a HPAL process.

<4-1. HPAL Process of Nickel Oxide Ore>

First, the hydrometallurgical process using a HPAL process for a nickel oxide ore includes: a leaching step S11 in which sulfuric acid is added into a slurry of a nickel oxide ore, and the resultant mixture is leached under high temperature and high pressure; a solid-liquid separation step S12 in which the leached residues are separated while the leached slurry is multi-stage washed, and a leachate containing impurity elements together with nickel and cobalt is obtained; a neutralization step S13 in which the pH of the leachate is adjusted, and the neutralized precipitate containing impurity elements is separated to obtain a neutralized final solution containing zinc together with nickel and cobalt; and a sulfurization step S14 in which the neutralized final solution is subjected to a sulfurization process to form a mixed sulfide containing nickel and cobalt.

In a leaching step S11, by using a high temperature pressure vessel (autoclave) and the like, sulfuric acid is added into a slurry of a nickel oxide ore, and the resultant mixture is subjected to a stirring process at a temperature of 220 to 280° C. to form a leached slurry composed of leached residues and a leachate.

Examples of the nickel oxide ore include a so-called laterite ore mainly such as a limonite ore and a saprolite ore. The nickel content of the laterite ore is generally 0.8 to 2.5% by weight, and the nickel is contained as a hydroxide or a calcium silicate (magnesium silicate) ore. Further, the content of iron is 10 to 50% by weight, and the iron is mainly in a form of a trivalent hydroxide (goethite), and divalent iron is partly contained in a calcium silicate ore. In addition, in a leaching step S11, in addition to such a laterite ore, an oxide ore containing a valuable metal such as nickel, cobalt, manganese, copper, and the like, for example, manganese nodules existed on the deep sea bottom, and the like are used.

Further, in the periphery of a deposit of a nickel oxide ore, a mother rock having a high magnesium grade almost without containing nickel, or a rock called bedrock or host rock is also coexisted, however, these rocks are dissolved by acid and can also be utilized as a magnesium source in the present embodiment.

In a solid-liquid separation step S12, a leached slurry formed in a leaching step S11 is subjected to multi-stage washing, and a leachate containing nickel and cobalt, and leached residues are obtained.

In a neutralization step S13, a neutralizing agent such as a magnesium oxide, and a calcium carbonate is added so that the pH is 4.0 or less, and a neutralized precipitate slurry containing trivalent iron and a mother liquid for the recovery of nickel is formed, while suppressing the oxidation of the leachate.

In a sulfurization step S14, hydrogen sulfide gas is blown into a mother liquid for the recovery of nickel, as a result, a sulfide containing nickel and cobalt (nickel-cobalt mixed sulfide), which has less impurity components, and a barren solution (solution after sulfurization) in which a nickel concentration is stabilized at a low level are obtained. In addition, in a case where zinc is contained in a mother liquid for the recovery of nickel, prior to the separation of nickel and cobalt as sulfides, zinc can selectively be separated as a sulfide.

In the sulfurization step S14, a slurry of the nickel-cobalt mixed sulfide is subjected to a settling separation process by using a settling separation apparatus such as a thickener, the nickel-cobalt mixed sulfide is separated and recovered from the bottom of the thickener, and further the aqueous solution component is overflowed and recovered as a solution after sulfurization. The solution after sulfurization is a sulfuric acid solution containing magnesium, calcium, and the like, remaining without being sulfurized. Therefore, a magnesium oxide with high purity can be obtained by the application of the above-described production process of a magnesium oxide by using the solution after sulfurization.

Herein, when the solution after sulfurization obtained in the sulfurization step S14 is used as a raw material for a production process of a magnesium oxide, impurities contained in the sulfuric acid solution are preferably removed as much as possible. That is, in the solution after sulfurization obtained through the sulfurization step S14 in a hydrometallurgical process for a nickel oxide ore, impurities of a metal such as iron and aluminum, a heavy metal, and the like are contained in addition to magnesium and calcium. Therefore, prior to the production of a magnesium oxide by using the obtained solution, these impurities are desirably removed. Therefore, next, by using the solution after sulfurization obtained in the sulfurization step S14, the following wastewater treatment step S15 is performed.

<4-2. Wastewater Treatment Step>

In a wastewater treatment step S15, a neutralizing agent is added into the solution after sulfurization obtained through a sulfurization step S14 (wastewater treatment start solution) to adjust the pH, and a neutralized precipitate containing impurities such as iron and aluminum, a heavy metal, and the like is formed. Accordingly, impurities can be removed from a sulfuric acid solution, a content of impurities in a crystal formed in the subsequent production of a magnesium oxide is lowered, and a magnesium oxide with high purity can be produced.

Specifically, first, as described in Patent Literature 2, a first neutralizing agent is added into a solution after sulfurization to obtain relatively low pH, and aluminum is separated at the low pH, then an oxidation neutralization process in which a second neutralizing agent is added for the oxidation is performed, and manganese is separated as a precipitate. Subsequently, a third neutralizing agent is further added into the wastewater after the separation of manganese to adjust the pH to 7.0 to 8.5, and the resultant mixture is subjected to solid-liquid separation to obtain a neutralized precipitate and a wastewater treatment final solution (effluent waste liquid).

Further, accordingly, a magnesium oxide is produced as described above by using the wastewater treatment final solution (effluent waste liquid) containing magnesium and calcium, which is obtained through a sulfurization step S14 of a hydrometallurgical process for a nickel oxide ore, and from which impurities have been removed in a wastewater treatment step S15.

<4-3. Production Process of Magnesium Oxide>

That is, a calcium separation step S16 in which a sulfuric acid solution (effluent wastewater) containing magnesium and calcium is concentrated, and calcium is precipitated and separated as a calcium sulfate; a magnesium crystallization step S17 in which the obtained solution is further concentrated, and magnesium is precipitated and separated as a magnesium sulfate; a roasting step S18 in which the separated crystal of magnesium sulfate is roasted together with a reducing agent, and a magnesium oxide and sulfurous acid gas are obtained; and a washing step S19 in which the magnesium oxide obtained by the roasting is washed; are performed. Further, since each step is the same as the above, detailed description thereof will be omitted.

As described above, according to the production process of a magnesium oxide, a magnesium oxide can be produced efficiently and with high purity from a solution after sulfurization obtained in the sulfurization step S14 in a hydrometallurgical process for a nickel oxide ore.

Further, by the production of a magnesium oxide based on a hydrometallurgical process for a nickel oxide ore using a HPAL process as described above, the amount of the residues generated in a HPAL process can be reduced, and further the produced magnesium oxide can repeatedly be used as a neutralizing agent to be used in the process. Accordingly, the amount of the neutralizing agent to be newly used can be reduced, and also in view of operating costs and the like, an efficient operation can be realized.

<4-4. Sulfuric Acid Production Step>

In addition, in the above-described production process of a magnesium oxide, in the roasting step S18, as shown in the above reaction formula (i), a magnesium sulfate is subjected to reduction roasting, and as a result, a magnesium oxide is obtained, and further sulfurous acid gas ($SO_2$) is generated. The generated sulfurous acid gas cannot be released to the atmosphere as it is. On the other hand, the sulfurous acid gas can effectively be utilized for a raw material of sulfuric acid. Therefore, a sulfuric acid production step S20 in which the generated sulfurous acid gas is collected and converted into sulfuric acid can be performed.

In a sulfuric acid production step S20, the sulfurous acid gas obtained through a roasting step S18 is collected and used for the production of sulfuric acid. The production process of sulfuric acid is not particularly limited, and a known process can be used therefor.

As described above, sulfurous acid gas is collected and used for the production of sulfuric acid in a sulfuric acid production step S20, and the produced sulfuric acid can be utilizes again as the sulfuric acid to be used in a leaching step S11 of the above-described hydrometallurgical process for a nickel oxide ore. Accordingly, the amount of the sulfuric acid to be newly prepared can be reduced, the operation cost is reduced, and more efficient operation can be realized. In addition, the waste amount can also be reduced, and the load on the environment can drastically be reduced.

EXAMPLES

5. Example

Hereinafter, Examples of the present invention will be described, however, the present invention is not limited to the following Examples.

Example 1

Production of Magnesium Oxide with High Purity (Separation of Calcium Sulfate and Crystallization of Magnesium Sulfate)

300 mL of an aqueous solution, in which a calcium sulfate dihydrate and a magnesium sulfate heptahydrate were dissolved in pure water, and the magnesium concentration and the calcium concentration were adjusted to be 25 g/L and 0.5 g/L, respectively, was prepared. The solution was divided into three equal parts as samples 1 to 3, and each of the samples 1 to 3 was put in a beaker with a volume of 200 mL.

Next, a water bath was arranged in a draft while maintaining at 70° C., the samples 1 to 3 were heated to evaporate the water content, and the solution was concentrated. The concentration of the solution proceeded as follows: initially, the solution was put in a water bath at 70° C.; an amount of water, which is around an adequate amount for not precipitating a crystal, was evaporated; and then air drying (evaporation) was performed while maintaining at 30° C. in the water bath and while accurately weighing the evaporation amount. After the retention for 2 to 5 hours, precipitation of a crystal was observed. Accordingly, the crystal amount and the liquid amount after the filtration of crystals were measured respectively, and each metal ion concentration was analyzed by ICP. The following Table 1 shows analysis results for each sample.

TABLE 1

|  | Sample 1 | Sample 2 | Sample 3 |
|---|---|---|---|
| Evaporated liquid amount (ml) | 40 | 51 | 60 |
| Crystal precipitation amount after drying (mg) | 40 | 50 | 200 |
| Filtrate amount (ml) | 57 | 46 | 36 |
| Mg concentration in filtrate (g/l) | 44 | 55 | 64 |
| Ca concentration in filtrate (g/l) | 0.85 | 0.90 | 0.48 |
| Ca removal rate (%) | 3 | 18 | 65 |
| Specific gravity | 1.19 | 1.25 | 1.28 |
| Mg distribution to filtrate (%) | 99.5 | 99.3 | 92.8 |

As shown in Table 1, it was found that the precipitation amount of crystals is increased along with the increase of the evaporated liquid amount. Further, the amount of the calcium remaining in the solution side (filtrate side) was calculated from the analysis values using ICP, and the remaining rate and removal rate of the calcium were determined. As a result, the remaining rate and removal rate of the calcium showed that 3% to 65% of calcium could be precipitated and separated as a crystal of a calcium sulfate dihydrate while leaving 99.5% to 92.8% of the magnesium contained in the start solution of the filtrate side.

Figure 5:
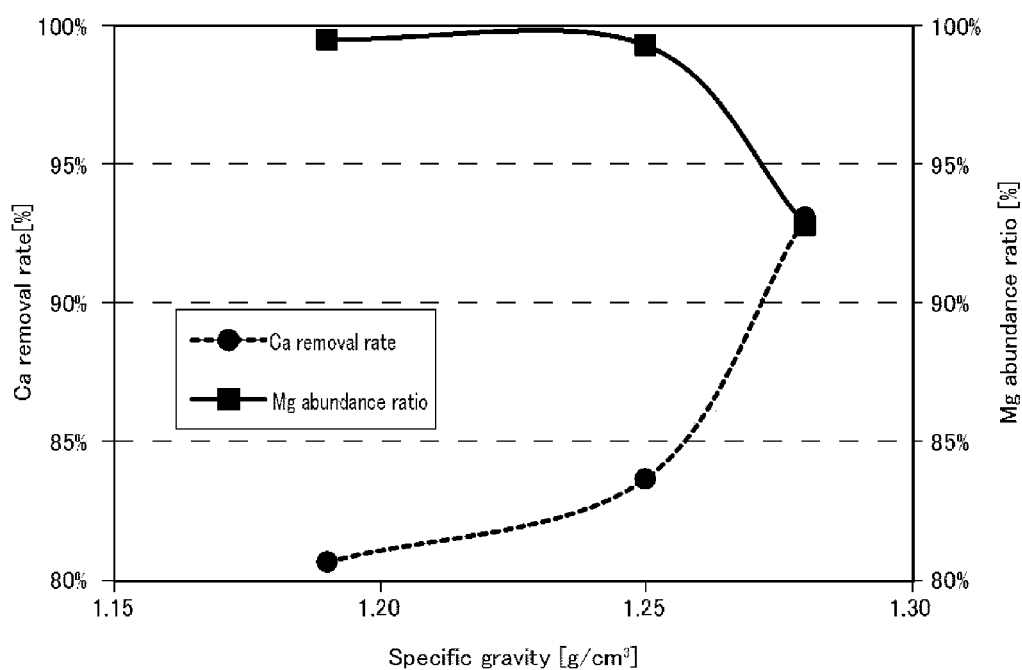
FIG. 5 is a graph showing a removal rate of calcium and an abundance ratio of the magnesium in a solution, for the specific gravity of the solution.

Further, FIG. 5 is a graph showing a removal rate of calcium and an abundance ratio of the magnesium in a solution, for the specific gravity of the solution. From the graph in FIG. 5, it was found that when the specific gravity of the solution is in particular, in the range of 1.15 to 1.30 g/cm$^3$, particularly around 1.25 g/cm$^3$, the concentration process for separation of calcium is terminated, and a crystal of calcium can effectively be precipitated and separated while largely maintaining the remaining amount of the magnesium in the solution.

Next, the concentration was further continued by using a solution at the same enrichment as that in sample 3. That is, the concentration was continued by natural evaporation, and the magnesium in the solution was allowed to be crystallized. As a result, a calcium sulfate dihydrate was precipitated, and successively a crystal of a magnesium sulfate heptahydrate was started to be precipitated, and as a result the separation from the solution could be performed. Further, when calculation was performed based on the analysis values, there were 0.05 mol of a magnesium sulfate heptahydrate, and 0.005 mol of a calcium sulfate dihydrate (Mg:Ca=10:1).

In addition, in order to investigate the influence of particle diameter on the crystal grade in a case where the magnesium from a solution that had been concentrated as in the samples 1 to 3 was crystallized, a solution of a magnesium concentration of 25 g/L and a calcium concentration of 0.5 g/L (simulated solution after concentration) was prepared by using a reagent of a magnesium sulfate heptahydrate and a calcium sulfate dihydrate, and separated by 200 mL. Further, one was exposed to ambient air and air dried (solar dried), and a crystal having a large particle diameter was obtained (see FIG. 3(A)). The other was heated to 80° C. in a water bath, and then cooled to 30° C., as a result, a crystal having a small particle diameter was obtained (see FIG. 3(B)).

Further, the air drying (solar drying) was performed by the leaving of a solution for one month in a place where a roof is only provided so that rain does not fall on the solution in December under the following conditions: the average temperature of 8.3° C., the maximum temperature of 11.8° C., the minimum temperature of 5.4° C., and the hours of daylight of 112 hours in total, and during the period around 140 g of water content was evaporated.

Accordingly, each crystal obtained as described above was subjected to an ICP analysis, and the Ca grade in a crystal was investigated. Analysis results are shown in the following Table 2.

TABLE 2

| Drying process | Air drying (Solar drying) | Natural evaporation (Water bath) |
|---|---|---|
| Picture of crystal | FIG. 3(A) | FIG. 3(B) |
| Particle diameter | Large | Small |
| Crystal weight (g) | 33.1 | 25.3 |
| Filtrate amount after crystal precipitation (ml) | 27.5 | 33.0 |
| Crystal Ca grade (wt/%) | 0.20 | 0.32 |
| Crystal Mg grade (wt/%) | 9.7 | 10.0 |

As shown in FIG. 2, it was found that the Ca grade in a crystal can be decreased by air drying (solar drying).

(Roasting)

Next, the crystals of a magnesium sulfate heptahydrate, which had been separated and obtained from a solution by the air drying described above, were divided into two portions, and the two portions were put in two crucibles, respectively. In these crucibles, carbon (pure graphite: C=100%) was added as a reducing agent in an amount of 0.025 mol and in an amount of 0.05 mol, respectively, each added carbon was heated to 1000° C. while blowing 2.5 liters of air per minute, then retained for one hour, and gradually cooled. Further, the additive amounts of carbon was an amount corresponding to one equivalent and an amount corresponding to two equivalents of the amount required for reaction, respectively.

Figure 6:
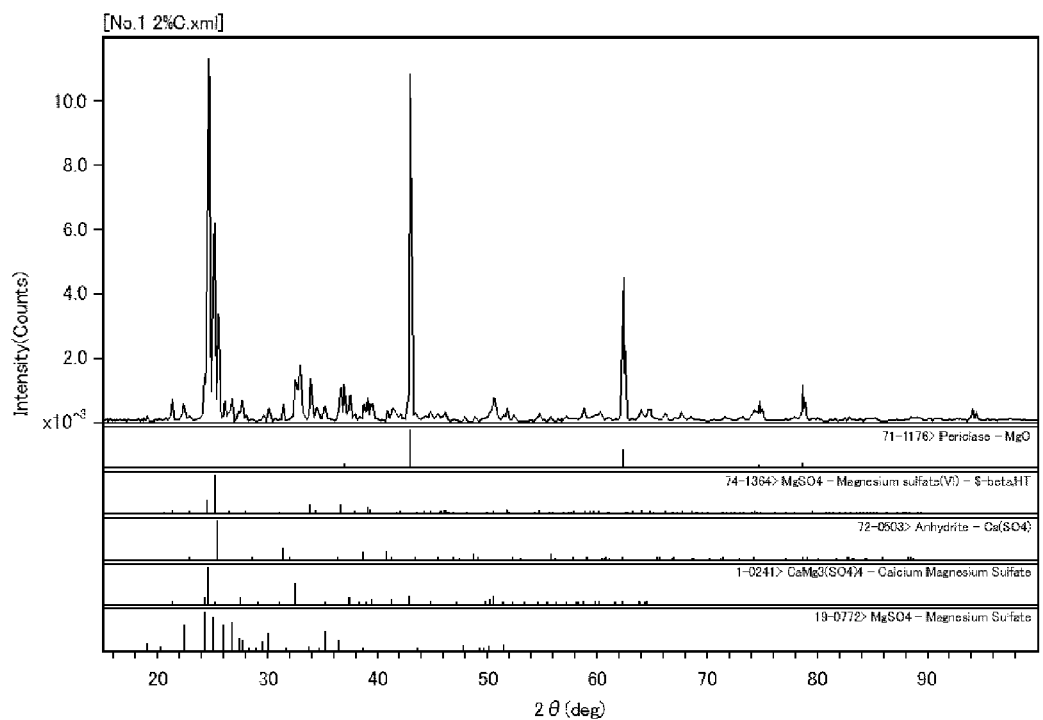
FIG. 6 is a graph showing XRD analysis results of a crystal in a case where the additive amount of carbon is 0.025 mol.
Figure 7:
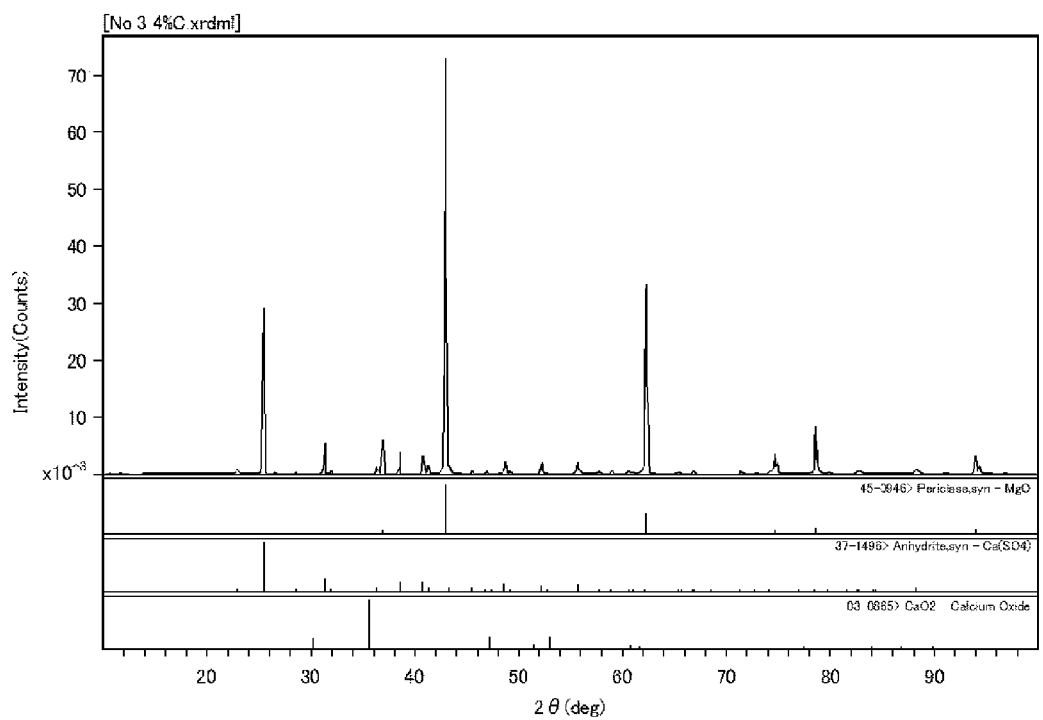
FIG. 7 is a graph showing XRD analysis results of a crystal in a case where the additive amount of carbon is 0.05 mol.

After the cooling, crystals were taken out from the crucibles, respectively, and each form was analyzed by using an X-ray diffraction (XRD) apparatus. FIG. 6 shows XRD analysis results of a crystal in a case where the additive amount of carbon is 0.025 mol, and FIG. 7 shows XRD analysis results of a crystal in a case where the additive amount of carbon is 0.05 mol.

From the results shown in FIG. 6, it was found that in a case where the additive amount of carbon is 0.025 mol (one equivalent), peaks of the magnesium sulfate are detected, and the crystals of magnesium sulfate obtained by concentration and separation are not all the magnesium oxide. That is, it was confirmed that the roasting is insufficient. On the other hand, from the results shown in FIG. 7, in a case where the additive amount of carbon is 0.05 mol (two equivalents), peaks of the magnesium sulfate were not detected, and peaks of the magnesium oxide were only detected. That is, it was confirmed that the magnesium sulfate obtained by concentration and separation all becomes the magnesium oxide, and the roasting is sufficient. Further, when the obtained magnesium oxide was analyzed by ICP, the grade of magnesium was 55% by weight, and the grade of calcium was 5% by weight.

On the other hand, the heating to 80° C. was performed by using a water bath, and then carbon corresponding to two equivalents was added for the crystals of magnesium sulfate obtained while maintaining at 30° C., and except for the above, the roasting was performed in the same manner as in a case of air drying. As a result, the grade of the obtained magnesium oxide was 55% by weight of magnesium, and 8% by weight of calcium.

From the above results, it was found that by the roasting of a magnesium sulfate using a carbon-based reducing agent that is two equivalents or more, all of the crystals can be roasted to a magnesium sulfate in a short period of time.

(Washing)

Next, the magnesium oxide obtained by the roasting under the condition that two equivalents of reducing agent are added into each magnesium sulfate that is obtained by the above-described air drying and the heating by a water bath, was prepared by 10 g each, and the each 10 g portion was put into a beaker with a volume of 200 mL. Subsequently, 120 mL of pure water was poured into the beaker, and the resultant mixture was stirred, and then left to stand to be immersed. After that, the supernatant was discharged, and the floated unreacted reducing agent and the ash after the reaction were separated. Further, solid-liquid separation was performed by using filter paper and a filtration bottle to produce a magnesium oxide. The obtained crystal of magnesium oxide was dried and analyzed by ICP.

As a result, the grade of the magnesium in the magnesium oxide was all 55% by weight, and was not changed from that before the washing. On the other hand, as to the grade of the calcium, the one obtained by the roasting of the magnesium sulfate obtained by air drying was lowered from 5% before washing to 0.66% after washing. Further, the one obtained by the roasting of the magnesium sulfate obtained by the heating by a water bath was lowered from 8% before washing to 1.06% after washing.

By the washing process as described above, the calcium remaining in a crystal could be reduced, and a magnesium oxide having a low content of impurities with high purity could be produced.

Example 2

Application to Wastewater Treatment (deMn Process) of Magnesium Oxide with High Purity Nickel, cobalt and the like, which had been contained in a nickel oxide ore, were leached in a sulfuric acid solution by using a known high pressure acid leach process. Next, the pH of the obtained leachate was adjusted, and the impurities were allowed to be precipitated to obtain a solution after neutralization. Next, a sulfurizing agent was added into the solution after neutralization to separate the nickel and cobalt as a sulfide, and wastewater after sulfurization was obtained. Further, the analysis values of the wastewater after sulfurization was as follows: the manganese was 2.9 g/L, the magnesium was 7.8 g/L, the aluminum was 2.9 g/L, the iron was 0.4 g/L, and the pH of the wastewater was 2.5.

The wastewater treatment was performed for the obtained wastewater after sulfurization in the manner described below.

First, the obtained wastewater after sulfurization was divided into two portions, one of the two portions was put in a reaction vessel with a volume of two liters, and stirred, and into which a slurry of slaked lime was added while maintaining at 60° C. to adjust the pH to 4.5. Next, solid and liquid were separated from each other, aluminum in the wastewater was separated as an aluminum precipitate, and the aluminum precipitate and the solution after dealumination were obtained. The concentration of the aluminum in the solution after dealumination was less than 0.01 g/L, the aluminum was sufficiently removed from the wastewater.

Next, 1.5 liters of solution after dealumination was put in a vessel with a volume of two liters, heated, and maintained the solution temperature at 60° C. Further, a slurry of magnesium oxide, the concentration of which had been adjusted to 20% by mass, was added as a neutralizing agent into the solution after dealumination to adjust the pH to 8.5. In addition, as shown in Example 1, the magnesium oxide to be used herein is a magnesium oxide that has been produced by the crystallization after the concentration of the solution (magnesium oxide obtained by air drying (solar drying) in Example 1), and has a low content of impurities and high purity.

Next, oxygen gas was blown into the bottom of the vessel through sintered glass at a flow rate of one liter per minute from a cylinder to perform an oxidation neutralization process for oxidation, and a slurry after oxidation neutralization was obtained. Further, during the oxidation, the above-described slurry of magnesium oxide was added as a neutralizing agent, and the pH was maintained in the range of 8.0 to 9.0. In addition, a silver-silver chloride electrode was immersed into the slurry as a reference electrode, and the oxidation-reduction potential was measured. The oxidation-reduction potential was stably changed between 50 and 300 mV.

Further, the endpoint of the oxidation neutralization process was determined by the confirmation of the analysis values of manganese concentration, and a point where the manganese concentration was reduced to one mg/L or less was determined to be the endpoint.

After the termination of the oxidation neutralization process, filtration was performed to separate into a manganese precipitate and a solution after demanganization. The grades (% by weight) were shown as a manganese precipitate (A) in the following Table 3, however, a manganese precipitate having a low content of calcium and sulfur with high purity could be obtained.

Next, a slurry of magnesium oxide was added into the solution after demanganization in which a manganese precipitate had been separated, the pH was adjusted in the range of 7.0 to 8.5, and a wastewater neutralized precipitate and a solution after neutralization were separated. The obtained solution after neutralization had water quality suitable for being discharged as effluent wastewater.

Further, from the obtained solution after neutralization, that is, from the effluent wastewater, a magnesium oxide was produced by using the same process as in Example 1. Specifically, the effluent wastewater was concentrated until the specific gravity is around 1.25 g/cm$^3$ while being heated, calcium was precipitated as a crystal of a calcium sulfate dihydrate, and filtration was performed to recover a filtrate having a large amount of magnesium. In addition, the filtrate was left for around one month under the same weather conditions as those in Example 1, and air dried to precipitate the magnesium content in the solution as a crystal.

A crystal of the magnesium salt thus obtained was put in a crucible, pure graphite was added in the crucible as a reducing agent in an amount corresponding to two equivalents of the amount required for reaction, the resultant mixture was heated to 1000° C. while blowing 2.5 liters of air per minute, then retained for one hour, and gradually cooled to obtain a magnesium oxide.

The obtained magnesium oxide was repeatedly used as a magnesium oxide of a neutralizing agent in the above-described oxidation neutralization process in the Example 2. As a result, as the grade (% by weight) is shown as a manganese precipitate (B) in the following Table 3, a manganese precipitate having a low content of calcium and sulfur with high purity could be obtained.

TABLE 3

|  | Mn | Ca | S |
|---|---|---|---|
| Manganese precipitate (A) | 57 | 2.1 | 1.6 |
| Manganese precipitate (B) | 62 | 0.3 | 0.2 |

It was found that as described above, as performed in Example 1, from a leachate of a nickel oxide ore, a magnesium oxide is produced by utilizing air drying, and a wastewater treatment is performed by using the magnesium oxide as a neutralizing agent, and as a result, a manganese precipitate with high purity can efficiently be obtained. Further, it was found that by using a process in which the magnesium oxide is repeatedly used as a neutralizing agent, the amount of the neutralizing agent to be newly used can be reduced, a manganese precipitate having favorable quality at a degree of being put out to the outside can continuously be obtained, and further the generated amount of the residues can be reduced.

Example 3

In the roasting step of Example 1, crystals of a magnesium sulfate heptahydrate, which had been separated and obtained from the solution obtained in the same manner as in Example 1, were divided into two portions, and the two portions were put in two crucibles, respectively. In these crucibles, charcoal in the composition shown in the following Table 4 was added as a reducing agent in an amount of 0.025 mol and in an amount of 0.05 mol in terms of carbon element, respectively, each added charcoal was heated to 1000° C. while blowing 2.5 liters of air per minute, then retained for one hour, and gradually cooled. Further, the additive amounts of charcoal was an amount corresponding to one equivalent and an amount corresponding to two equivalents of the amount required for reaction, respectively.

TABLE 4

| Analysis item | |
|---|---|
| Water content (%) | 9.0 |
| Ash content (%) | 1.9 |
| Fixed carbon (%) | 94 |
| Calcium (%) | 1.0 |
| Magnesium (%) | 0.3 |
| Manganese (%) | <0.1 |
| Iron oxide (%) | <0.1 |
| Potassium + Sodium (%) | 0.5 |

TABLE 4-continued

| Analysis item | |
|---|---|
| Silicic acid (%) | <0.1 |
| Phosphoric acid (%) | 0.1 |
| Other carbonic acid, etc. (%) | 0.1 |

After the cooling, crystals were taken out from the crucibles, respectively, and each form was analyzed by using an X-ray diffraction (XRD) apparatus.

In the same manner as in Example 1, in a case where the additive amount of charcoal is 0.025 mol (one equivalent), the same peaks of the magnesium sulfate as in FIG. 6 were detected, and the crystals of magnesium sulfate obtained by concentration and separation were not all the magnesium oxide. On the other hand, in a case where the additive amount of charcoal is 0.05 mol (two equivalents), the peaks of the magnesium sulfate were not detected as in FIG. 7, and peaks of the magnesium oxide were only detected. That is, it was confirmed that the magnesium sulfate obtained by concentration and separation all becomes the magnesium oxide, and the roasting is sufficient.

From the above results, it was found that even by using charcoal as a reducing agent, by the roasting of a magnesium sulfate in a carbon amount of two equivalents or more, all of the crystals can be roasted to a magnesium sulfate in a short period of time.

Comparative Example 1

In the same manner as in the above Example 2, nickel, cobalt and the like, which had been contained in a nickel oxide ore, were leached in a sulfuric acid solution by using a known high pressure acid leach process. Next, the pH of the obtained leachate was adjusted, and the impurities were allowed to be precipitated to obtain a solution after neutralization. Next, a sulfurizing agent was added into the solution after neutralization to separate the nickel and cobalt as a sulfide, and wastewater after sulfurization was obtained. Further, the analysis values of the wastewater after sulfurization was as follows: the manganese was 2.9 g/L, the magnesium was 7.8 g/L, the aluminum was 2.9 g/L, the iron was 0.4 g/L, and the pH of the wastewater was 2.5.

The wastewater treatment was performed for the obtained wastewater after sulfurization in the manner described below.

First, the obtained wastewater after sulfurization was divided into two portions, one of the two portions was put in a reaction vessel with a volume of two liters, and stirred, and into which a slurry of slaked lime was added while maintaining at 60° C. to adjust the pH to 4.5. Next, solid and liquid were separated from each other, aluminum in the wastewater was separated as an aluminum precipitate, and the aluminum precipitate and the solution after dealumination were obtained. The concentration of the aluminum in the solution after dealumination was less than 0.01 g/L, the aluminum was sufficiently removed from the wastewater.

Next, 1.5 liters of solution after dealumination was put in a vessel with a volume of two liters, heated, and maintained the solution temperature at 60° C. Further, a slurry of slaked lime, the concentration of which had been adjusted to 20% by mass, was added as a neutralizing agent into the solution after dealumination to adjust the pH to 8.5. That is, a slurry of slaked lime was used as a neutralizing agent in place of the magnesium oxide having a low content of impurities with high purity, which was obtained by the crystallization of a crystal by the heating of a solution and was used in Example 1.

Next, oxygen gas was blown into the bottom of the vessel through sintered glass at a flow rate of one liter per minute from a cylinder to perform an oxidation neutralization process for oxidation, and a slurry after oxidation neutralization was obtained. Further, during the oxidation, a slurry of slaked lime was added as a neutralizing agent, and the pH was maintained in the range of 8.0 to 9.0. In addition, a silver-silver chloride electrode was immersed into the slurry as a reference electrode, and the oxidation-reduction potential was measured. The oxidation-reduction potential was stably changed between 50 and 300 mV.

Further, the endpoint of the oxidation neutralization process was determined by the confirmation of the analysis values of manganese concentration, and a point where the manganese concentration is reduced to one mg/L or less was determined to be the endpoint.

After the termination of the oxidation neutralization process, filtration was performed to separate into a manganese precipitate and a solution after demanganization. The grades (% by weight) were shown as a manganese precipitate (C) in the following Table 5, however, the manganese precipitate was a manganese precipitate having an extremely high content of calcium and sulfur, and the grade capable of being utilized as a manganese resource could not be obtained.

TABLE 5

|  | Mn | Ca | S |
|---|---|---|---|
| Manganese precipitate (C) | 21 | 15 | 12 |

The invention claimed is:

1. A wastewater treatment process in which a first neutralizing agent is added into sulfuric acid-acidic wastewater containing aluminum, magnesium, and manganese to separate an aluminum hydroxide precipitate and obtain a solution after dealumination, then a second neutralizing agent and an oxidizing agent are added to the solution after dealumination to separate a manganese precipitate and obtain a solution after demanganization, and then a third neutralizing agent is added to the solution after demanganization to obtain a wastewater precipitate and effluent wastewater, comprising,
using for part or all of first to third neutralizing agents to be added a magnesium oxide produced through steps (1) to (4):
(1) a calcium separation step of concentrating effluent wastewater obtained by separating aluminum and manganese from sulfuric acid-acidic wastewater, and precipitating and separating calcium contained in the effluent wastewater as a calcium sulfate;
(2) a magnesium crystallization step of further concentrating a solution obtained through the calcium separation step, and precipitating and separating magnesium contained in the solution as a magnesium sulfate;
(3) a roasting step of roasting the magnesium sulfate separated in the magnesium crystallization step together with a reducing agent, and obtaining a magnesium oxide and sulfurous acid gas; and
(4) a washing step of washing the magnesium oxide obtained in the roasting step.

2. The wastewater treatment process according to claim 1, wherein
an endpoint of concentration in the calcium separation step (1) is set as a time point when specific gravity of a solution after concentration becomes 1.25 g/cm$^3$.

3. The wastewater treatment process according to claim 1, wherein
concentration of the effluent wastewater obtained by separating aluminum and manganese from sulfuric acid-acidic wastewater in the calcium separation step (1) and the solution obtained in the magnesium crystallization step (2) is performed by air drying.

4. The wastewater treatment process according to claim 1, wherein
a first neutralizing agent is added into the sulfuric acid-acidic wastewater to adjust pH to 7.0 to 8.5, and then filtrate obtained from solid-liquid separation is used for the calcium separation step (1).

5. The wastewater treatment process according to claim 1, wherein
in the roasting step (3), any one or more kinds of coke, coal, charcoal, bamboo charcoal, and spent carbon are used as a reducing agent.

6. The wastewater treatment process according to claim 1, wherein
the sulfuric acid-acidic wastewater is a solution after a nickel oxide ore is leached together with sulfuric acid under high temperature and high pressure to obtain a leachate containing nickel, a neutralizing agent containing calcium and/or magnesium is added into the obtained leachate to remove impurities, and then a sulfurizing agent is added into the resultant leachate to precipitate and separate the nickel.

7. The wastewater treatment process according to claim 6, wherein
sulfurous acid gas generated in the roasting step (3) is converted into sulfuric acid, and the obtained sulfuric acid is repeatedly used as sulfuric acid to be used for leaching of a nickel oxide ore under high temperature and high pressure.

8. The wastewater treatment process according to claim 1, wherein
water is added into a crystal of magnesium sulfate obtained in the magnesium crystallization step (2) to dissolve the crystal, and the obtained solution is repeatedly concentrated in the magnesium crystallization step again.

9. The wastewater treatment process according to claim 1, wherein
an endpoint of concentration in the calcium separation step (1) is set as a time point when specific gravity of a solution after concentration is in a range of 1.1 to 1.3 g/cm$^3$.

* * * * *